US008473880B1

(12) United States Patent
Bennett et al.

(10) Patent No.: US 8,473,880 B1
(45) Date of Patent: *Jun. 25, 2013

(54) SYNCHRONIZATION OF PARALLEL MEMORY ACCESSES IN A DATAFLOW CIRCUIT

(75) Inventors: David W. Bennett, Longmont, CO (US); Prasanna Sundararajan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 12/791,256

(22) Filed: Jun. 1, 2010

(51) Int. Cl.
*G06F 17/50* (2006.01)

(52) U.S. Cl.
USPC .......................................... 716/104

(58) Field of Classification Search
USPC .................................. 716/100–139
See application file for complete search history.

(56) References Cited

U.S. PATENT DOCUMENTS

| | | | | |
|---|---|---|---|---|
| 4,814,978 A * | 3/1989 | Dennis | ........................ | 712/201 |
| 5,226,131 A | 7/1993 | Grafe et al. | | |
| 5,465,368 A * | 11/1995 | Davidson et al. | ............... | 712/27 |
| 5,918,242 A | 6/1999 | Sarma et al. | | |
| 7,315,991 B1 * | 1/2008 | Bennett | ........................ | 716/103 |
| 7,490,218 B2 | 2/2009 | Eggers et al. | | |
| 8,332,597 B1 * | 12/2012 | Bennett | ........................ | 711/154 |
| 2003/0188299 A1 * | 10/2003 | Broughton et al. | ............ | 717/141 |
| 2006/0179429 A1 * | 8/2006 | Eggers et al. | ................. | 717/151 |
| 2008/0005357 A1 | 1/2008 | Malkhi et al. | | |

OTHER PUBLICATIONS

U.S. Appl. No. 12/539,520, filed Aug. 11, 2009, Bennett.
Dennis, Jack B. et al., "An Efficient Pipeline Dataflow Processor Architecture," *Proc. of the 1988 ACM/IEEE Conference on Supercomputing*, Nov. 14, 1988, pp. 368-373, IEEE Computer Society Press, Los Alamitos, California, USA.
Putnam, Andrew et al., "CHIMPS: A C-Level Compilation Flow for Hybrid CPU-FPGA Architectures," *Proc. of the 16th International ACM/SIGDA Symposium on Field Programmable Gate Arrays*, Feb. 24, 2008, pp. 261-269, ACM, New York, New York, USA.
Swanson, Steve et al., "WaveScalar," *Proc. of the 36th International Symposium on Microarchitecture*, Dec. 3, 2003, pp. 1-12, IEEE Computer Society Press, Los Alamitos, California, USA.
Wikipedia, "Dataflow architecture," *Wikipedia*, last modified Aug. 27, 2007, downloaded Mar. 26, 2008 , pp. 1-2, <http://en.wikipedia.org/wiki/Dataflow_architecture>.

* cited by examiner

*Primary Examiner* — Vuthe Siek
*Assistant Examiner* — Aric Lin
(74) *Attorney, Agent, or Firm* — LeRoy D. Maunu; Lois D. Cartier (57) ABSTRACT

Approaches for creating a pipelined circuit design from a high level language (HLL) specification. In one embodiment, the HLL specification is translated into an intermediate level language specification of operations of the pipelined circuit design, and a data dependency graph of the operations is created. A sequence of operations that is bounded by two write operations and that has no intervening write operations between the two write operations is identified, along with two or more read operations within the sequence. A pipelined design specification is generated from the dependency graph and hardware components associated with the operations in the intermediate level language specification. At least two of the components corresponding to the two or more read operations access a memory in parallel, and each component corresponding to the two or more read and the two write operations requires a synchronization token as input and outputs a synchronization token upon completion of the operation.

19 Claims, 8 Drawing Sheets

SYNCHRONIZATION OF PARALLEL MEMORY ACCESSES IN A DATAFLOW CIRCUIT

FIELD OF THE INVENTION

The embodiments of the present invention generally relate to dataflow machines and synchronizing accesses to shared memory.

BACKGROUND

In a hardware dataflow architecture, a software program may be implemented using pipelined hardware. Such implementation can provide a dramatic performance improvement, as multiple data paths resulting from conditional operations can be implemented to execute concurrently. The dataflow architecture uses dependencies defined by the dataflow graph of a program to determine those operations that can be executed, based on the availability of the data that each operation requires for execution. When the data required by an operation is available, the operation proceeds.

A dataflow architecture typically uses dataflow memory to pass data between components as it is processed and a shared memory to store data as instructed by the software program. The dataflow memory may include first-in-first-out (FIFO) buffers between pipeline stages of a dataflow architecture. Alternatively, a token memory may be monitored by a scheduler, which issues instructions when operands are tagged as being available in the token memory.

For some applications of a dataflow architecture, it may be desirable to access a memory that is external to the dataflow memory. For a dataflow architecture having FIFO buffers between pipeline stages, the external memory is in addition to the FIFO buffers, and for a dataflow architecture having a token memory that is monitored by a scheduler, the external memory is in addition to the token memory. The external memory, which is random access, may be used for inputting data to the dataflow or outputting data from the data flow. However, in order to produce semantically correct results in executing a program on a dataflow machine, operations requiring accesses to the shared memory must be synchronized so a write operation does not proceed before all read operations for the existing data have completed.

The present invention may address one or more of the above issues.

SUMMARY

The described embodiments provide approaches for creating a pipelined circuit design from a high level language (HLL) specification. In one embodiment, the HLL specification is translated into an intermediate level language specification of operations of the pipelined circuit design, and a data dependency graph of the operations is created. A sequence of operations that is bounded by two write operations and that has no intervening write operations between the two write operations is identified, along with two or more read operations within the sequence. A pipelined design specification is generated from the dependency graph and hardware components associated with the operations in the intermediate level language specification. At least two of the components corresponding to the two or more read operations access a memory in parallel, and each component corresponding to the two or more read and the two write operations requires a synchronization token as input and outputs a synchronization token upon completion of the operation.

In some embodiments, each hardware component can include an instruction processor. In some embodiments, the two write operations can include a first write operation and a second write operation; where the component corresponding to the first write operation outputs a synchronization token to each of the components corresponding to the two or more read operations. In some embodiments, the component corresponding to the second write operation of the sequence can be configured to perform a write operation in response to receiving a synchronization token as input from each of the components corresponding to the two or more read operations.

In some embodiments, each hardware component can include a circuit core and the pipelined specification can include a netlist. The netlist may specify the component corresponding to the first write operation communicating the synchronization token to the components corresponding to the two or more read operations via respective first-in-first-out buffers. The netlist may specify components corresponding to the two or more read operations communicating the synchronization token to the component corresponding to the second write operation via respective first-in-first-out buffers.

The netlist can include a synchronize component coupled to the input of the component corresponding to the second write operation of the sequence and coupled to the outputs of the components that correspond to the two or more read operations. The synchronize component can be configured to output a synchronization token to the component corresponding to the second write operation in response to input of synchronization tokens from the components corresponding to the two or more read operations. The synchronize component can be selected from a set of components corresponding to instructions defined in the intermediate level language specification. The synchronize component can include a plurality of parameter inputs, where each of the plurality of parameter inputs is coupled in the netlist to receive a synchronization token from one of the components corresponding to one of the two or more read operations. The number of inputs in the plurality of parameter inputs an be greater than the number of components corresponding to the two or more read operations that access a memory in parallel.

In another embodiment, a method of creating a pipelined circuit design from a high level language (HLL) specification includes identifying in the HLL specification, a first set and a second set of memory pointers, wherein the pointers in the first set are independent of the pointers in the second set. The HLL specification is translated into an intermediate level language specification, and a dependency graph of operations contained in the intermediate level language specification is created. A netlist is generated from the dependency graph and hardware components that are associated with the operations of the intermediate level language specification. The netlist specifies that read and write operations to the memory addresses that correspond to the first set of memory pointers are performed concurrently with read and write operations to the memory addresses that correspond to the second set of memory pointers. In some embodiments, dependent components can be coupled with first-in-first-out buffers.

In some embodiments, the method can also include associating memory addresses corresponding to the first and second sets of memory pointers with respective synchronization tokens. The components corresponding to read and write operations can require as input, synchronization tokens corresponding to the memory addresses of the operations, and output respective synchronization tokens upon completion of the respective operations. The method can also include identifying from the dependency graph a sequence of operations that corresponds to the first set of memory pointers that is bounded by two write operations and that has no intervening write operations between the two write operations, and identifying two or more read operations within the sequence. The netlist can specify that at least two of the components corresponding to the two or more read operations access a memory in parallel, and each component corresponding to the two or more read and the two write operations can require a synchronization token corresponding to the first set of memory pointers.

An article of manufacture is provided in another embodiment. The article of manufacture includes a processor-readable storage medium that is configured with processor-executable instructions which cause one or more processors to process a circuit design. The instructions when executed by a processor causes the processor to translate a high level language (HLL) specification into an intermediate level language specification. A data dependency graph of the operations of the intermediate level language specification is created. A sequence of operations that is bounded by two write operations and has no intervening write operations between the two write operations is identified in the intermediate level language specification, and two or more read operations are identified within the sequence. A netlist is generated from the dependency graph and from hardware components associated with the operations of the low level language specification. At least two of the components corresponding to the two or more read operations access a memory in parallel. Each respective component that corresponds to the read and write operations requires a synchronization token as input and outputs a synchronization token upon completion of the operation.

In some embodiments, the two write operations can include a first write operation and a second write operation, and the component corresponding to the first write operation can output a synchronization token to each of the components corresponding to the two or more read operations. In some embodiments, the component corresponding to the second write operation of the sequence can be configured to perform a write operation in response to receiving a synchronization token as input from each of the components corresponding to the two or more read operations that access a memory in parallel.

In some embodiments, the netlist can include a synchronize component coupled to the input of the component corresponding to the second write operation of the sequence and the outputs of components corresponding to the two or more read operations. The synchronize component can be configured to output a synchronization token to the component corresponding to the second write operation in response to input of a synchronization token from each of the components corresponding to the two or more read operations.

In some embodiments, the instructions can configure the netlist such that the synchronization token from the component corresponding to the first write operation is communicated to the components corresponding to the two or more read operations via respective first-in-first-out buffers.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

A dataflow circuit design may be generated from a high level programming language (HLL) program and implemented in a programmable integrated circuit (IC) such as a multi-core processor or a field programmable gate array (FPGA). In order to produce semantically correct results, components used to implement program instructions must be arranged and coupled to control the sequence in which data values stored in an external memory, such as a random access memory (RAM), are read and modified. Synchronization tokens may be passed between access operations in order to control the order in which access operations are performed so that the intended ordering of accesses to the external memory, as specified in the HLL program, is honored in executing the instructions.

While semantically correct results can be achieved by performing external memory access operations in the sequential order indicated by the HLL program, in many dataflow architectures, it is conceivable that multiple accesses to monolithic memory can occur simultaneously if properly synchronized. For example, the external memory may be multi-ported or may be clocked at a faster speed than the program implemented in the programmable IC.

The described embodiments provide methods for synchronization in a hardware dataflow system in which independent external memory access operations are performed in parallel. By performing independent memory access operations concurrently, performance of the hardware dataflow circuit implemented program can be improved.

As used herein, the terms "dataflow memory" and "external memory" refer to the two different memories used in the described embodiments. The dataflow memory is a first-in-first-out (FIFO) memory and refers to that memory used in a dataflow machine to pass data between dataflow operations. The dataflow memory stores data to be passed between the operations of the dataflow machine as represented by the arcs in a dataflow graph. The external memory is a random access memory and refers to a supplemental memory used to store data results at memory locations as indicated by instructions of the program. Data from the external memory may be injected into the dataflow, and data may be ejected from the dataflow and stored in the external memory for external access. The external memory may be implemented within or outside of the implementing programmable IC.

In the examples described herein, two instructions are implemented for accessing the external memory. The instructions are named memread and memwrite. In processing a memread instruction, data parameters are read from the external memory and introduced into the dataflow memory for processing. In processing a memwrite instruction, data are extracted from the dataflow memory and stored in an external memory. In one embodiment, FIFOs are used to connect hardware modules implementing the program instructions. The hardware module for a memread or memwrite instruction will perform the operation and generate an output when all input parameters, including a memory synchronization token, have been received by the module. The generated output can then be used as a memory synchronization token to trigger the subsequent memwrite instruction. Each memread and memwrite instruction outputs a synchronization token, which is associated with the address read from or written to, to signal completion of the operation on that address. Processing of a memread instruction proceeds once an address and the synchronization token for that address are available. Processing of a memwrite instruction proceeds once the data to be written, an address, and the synchronization token for that address are available.

Because reading from memory does not alter data read from the memory, memread operations will not interfere with one another as far as the data being read is concerned. Therefore, every memread that occurs between two writes can be performed in parallel. If there are not enough ports on the memory for synchronization tokens, memreads may be performed in whichever order is most efficient. Since writing data to memory changes the contents of the memory, where the HLL program specifies a read that follows a write to the same address in the HLL program, the corresponding memread cannot be initiated until the memwrite has completed in order to avoid reading stale data.

In one embodiment, data dependencies between the memory access operations are analyzed to determine memread operations that are performed between two memwrite operations. The preceding memwrite operation is configured to generate a synchronization token for each of the identified memread operations. Each of the memread operations is configured to output a synchronization token after the memread operation has completed. The subsequent write operation is configured to execute after the synchronization tokens have been received from each of the identified memread operations.

Figure 1:
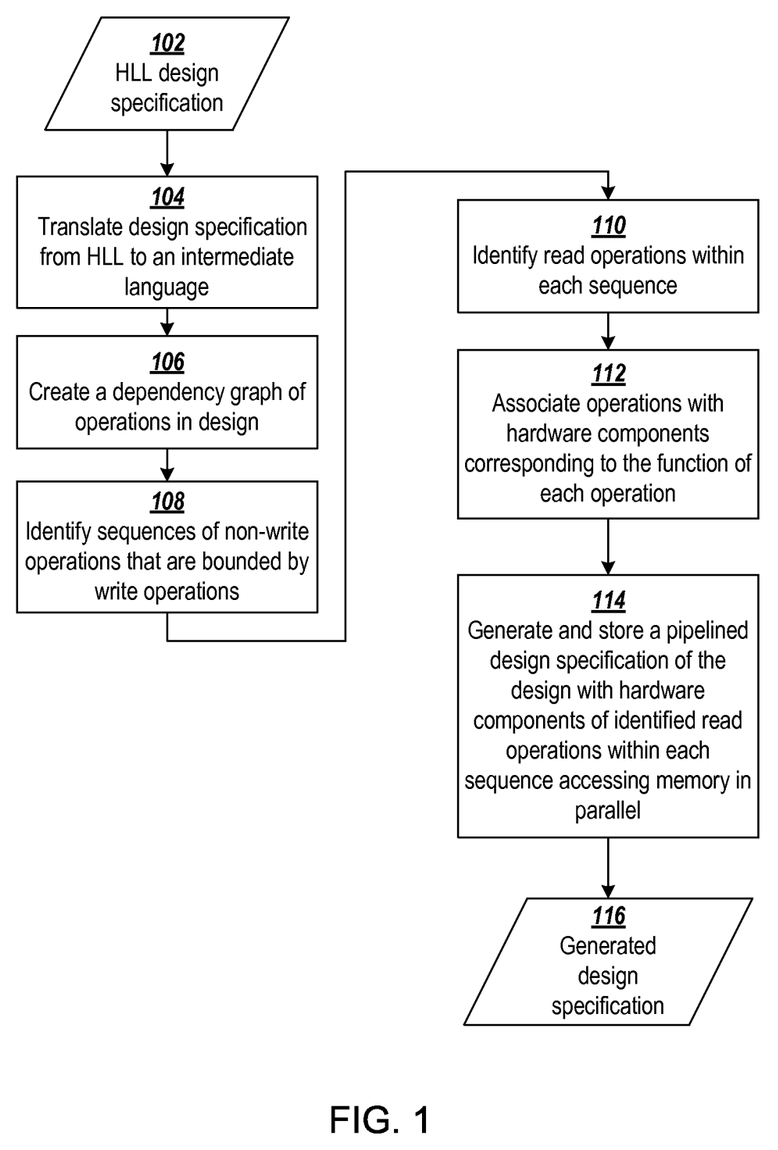
FIG. 1 illustrates a flowchart of a process for converting a high level language (HLL) specification into a dataflow circuit design with synchronized parallel memory access.

FIG. 1 illustrates a flowchart of a process for converting a high level language (HLL) specification into a dataflow circuit design with parallel memory access synchronized. HLL specification 102 is translated into an intermediate level language at step 104. Instructions of the intermediate level language generally correspond to logic blocks and operands of the instructions generally correspond to first-in-first-outs (FIFOs). U.S. Pat. No. 7,315,991 describes methods for compiling a program in a high-level language into a massively parallel pipelined system. The resulting system is a dataflow machine in which instructions are implemented as hardware blocks, and FIFO buffers provide the dataflow memory between the hardware blocks. U.S. Pat. No. 7,315,991, which is incorporated herein by reference, may be referenced for further description of the example parallel pipelined dataflows used in this description and the generating of a parallel pipelined dataflow machine from high-level source code.

A dependency graph of instructions within the intermediate level specification is created at step 106. Sequences of instructions that include two or more memread instructions that are bounded by first and second memwrite instructions are identified at step 108, and the memread instructions within each sequence are identified at step 110. In each such sequence there are no memwrite instructions between the first and second memwrite instructions that bound the sequence. Each instruction of the intermediate level specification is associated with a hardware component corresponding to the function of the respective instruction at step 112. In one embodiment, the operations may be associated with a processor core and one or more instructions of a multi-core CPU. In another embodiment, the operations may be associated with and correspond to individual circuit core specifications for implementing circuits on a programmable IC such as an FPGA. A pipelined design specification 116 of the intermediate level specification is then generated and stored at step 114 with hardware components of identified memread instructions within each sequence connected such that they access memory concurrently.

Figure 2:
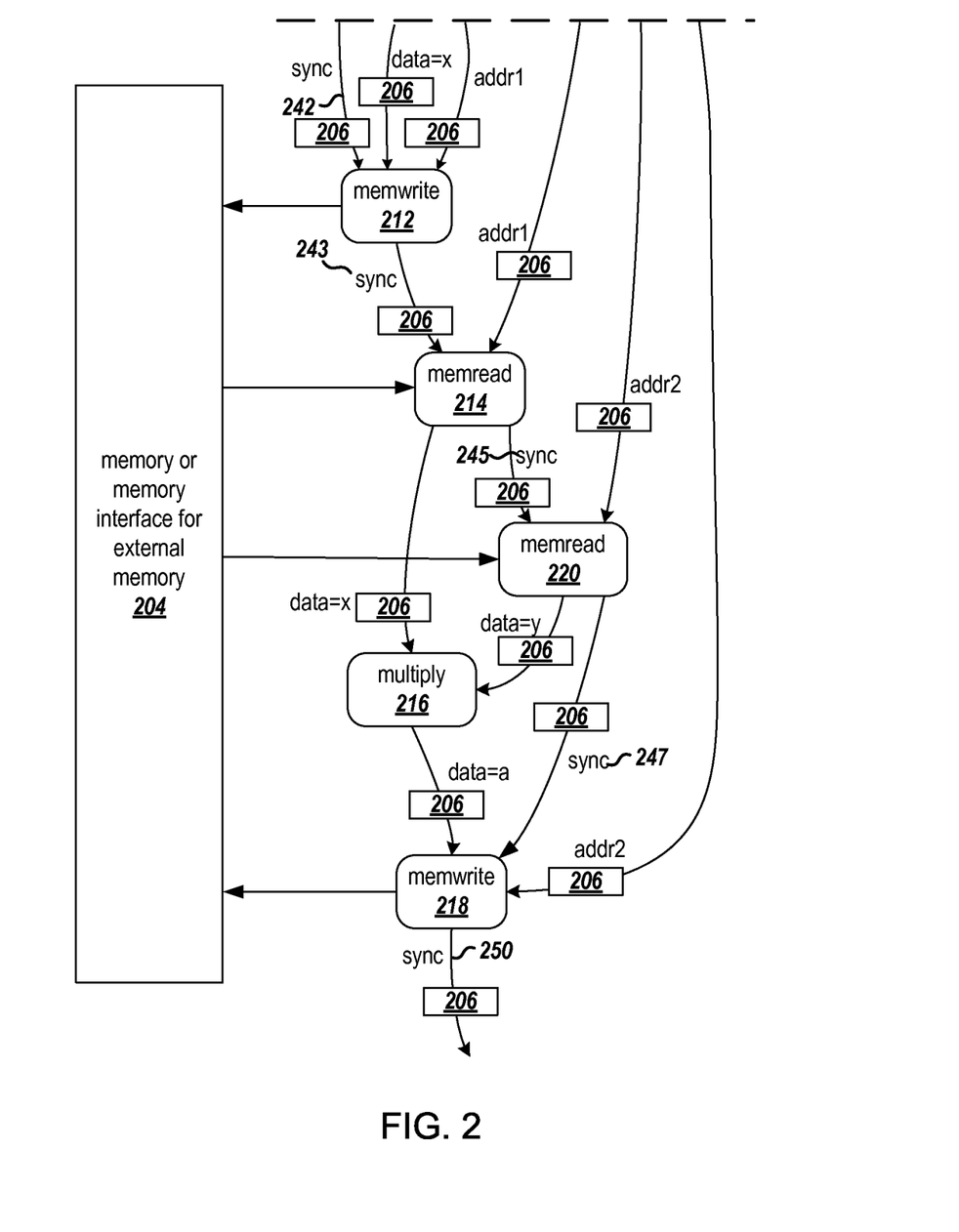
FIG. 2 illustrates a dataflow diagram of an example generated netlist having read operations arranged and configured to perform memory access operations sequentially.
Figure 3:
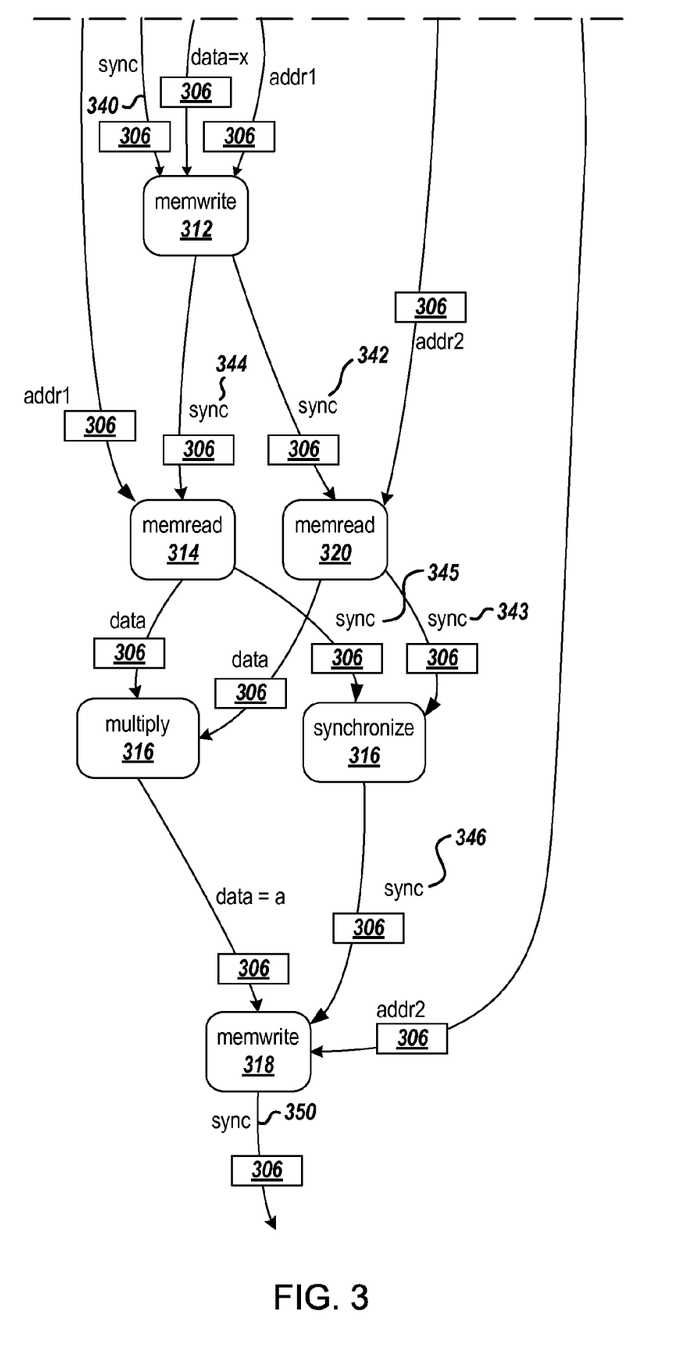
FIG. 3 illustrates a dataflow diagram of an example generated netlist having read operations arranged and configured to perform memory access operations in parallel.
Figure 4:
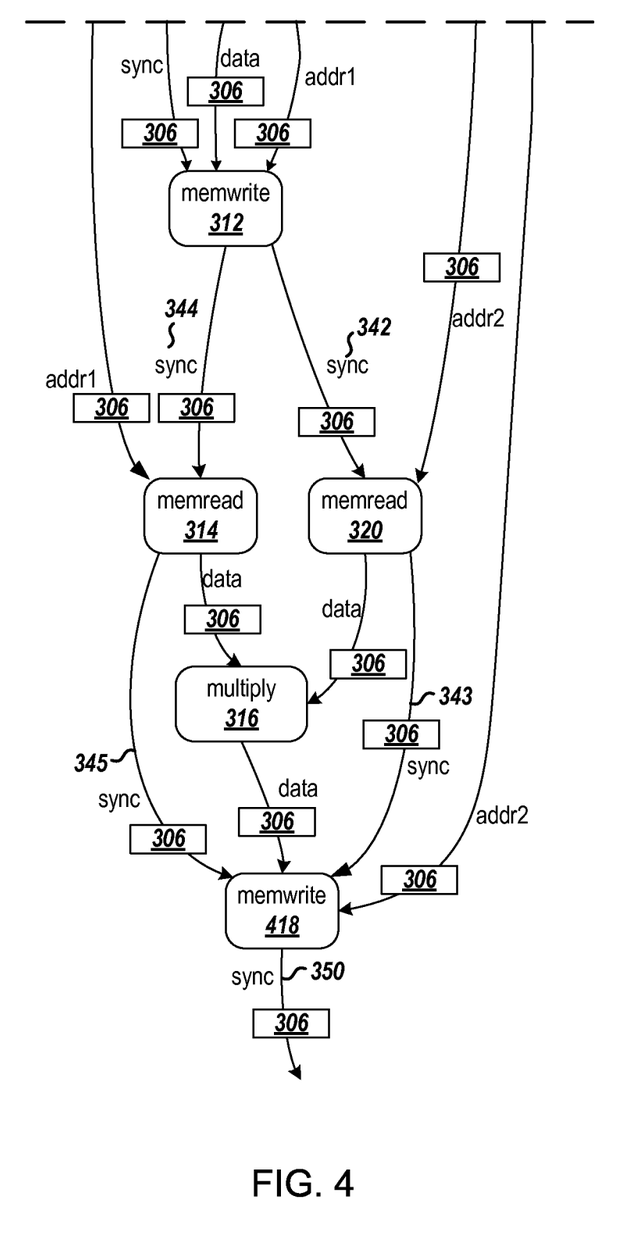
FIG. 4 illustrates, the dataflow diagram of FIG. 3 in which synchronization following parallel read operations is performed by the subsequent memwrite operation.

FIGS. 2, 3, and 4 show exemplary dataflow circuit implementations of the HLL code shown in Example 1, below.

*addr1=x;
int a=*addr1* *addr2;
*addr2=a;

EXAMPLE 1

FIG. 2 illustrates a dataflow diagram representing a netlist generated from the HLL code of Example 1, wherein memread operations are arranged and configured to access external memory 204 with memory access operations performed sequentially. Components implementing each instruction of the intermediate representation are interconnected by FIFOs 206. Each of memwrite components 212 and 218 require as input a synchronization token, an address to write to, and data to be written before a write operation is performed. Memread components 214 and 220 require as input the address to be read and a synchronization token before a read operation is performed.

In implementing the HLL code provided in Example 1 above, the value of x is written to addr1 by component 212. After the write is complete, component 212 outputs synchronization token 243 to memread component 214, which reads the value at addr1 once addr1 is available. Component 214 outputs the value read to multiply component 216 and outputs synchronization token 245 to memread component 220. Once all its inputs are available, memread component 220 reads the value at memory address addr2, outputs the value read to multiply component 216, and outputs synchronization token 247 to memwrite component 218. After the multiply component completes and the output value, the synchronization token 247, and addr2 are available to the memwrite component 218, the value is written to memory location addr2.

The example shown in FIG. 2 illustrates the dependencies between the sequence of memread and memwrite instructions of Example 1. In this example, the sequence includes two memread instructions, implemented by memread components 214 and 220, that are bounded by two memwrite instructions, implemented by memwrite components 212 and 218. Since memread components 214 and 220 are bounded by two sequential memwrite components 212 and 218, the memread components cannot affect one another and can be implemented to access the external memory in parallel.

FIG. 3 illustrates a dataflow circuit diagram in which independent read operations are configured to access external memory concurrently in accordance with several embodiments of the invention. Components implementing each instruction of the intermediate representation are interconnected by FIFOs 306 and coupled to external memory, such as shown in FIG. 2. Each of memwrite components 312 and 318 requires as input a synchronization token, an address to write to, and data to be written before a write operation is performed. Each of memread components 314 and 320 requires as input the address to be read and a synchronization token before a read operation is performed. In the example implementation, the memwrite component that corresponds to the memwrite instruction that begins the sequence, outputs a synchronization token to each memread component preceding the memwrite component that corresponds to the memwrite instruction that ends the sequence. The memread components can then perform read operations concurrently. A synchronize component collects the synchronization tokens generated by the memread components, and outputs a single synchronization token to the trigger the ending memwrite component once all of the generated synchronization tokens have been collected. The synchronize component may implement any instruction which can output a result using the input synchronization tokens as operands.

It is understood that the synchronize component may implement more than one instruction. For example, if a sequence between two write instructions includes four read instructions, four synchronization tokens A, B, C, and D are generated and collected before the second write operation is performed. The synchronize component can be implemented with three OR instructions, each instruction receiving two operands as input. The OR instruction modules can be connected with FIFOs such that: I=A OR B; J=C OR D; and Sync-Token=I OR J.

While a synchronization token must be received at each parameter input of the synchronize component, the instruction(s) implemented by the synchronize component need not have the same number of parameter inputs as the number of parallel read components. Rather, the necessary number of synchronization tokens needed to trigger a synchronize component may be generated by a preceding read or write component and output to corresponding parameter inputs of the synchronize component. This configuration may be useful when the synchronize function is performed by a memwrite component that has a fixed number of parameter inputs. For example, if a memwrite component is implemented with four parameter inputs, a parameter must be received at each input in order to trigger the memwrite component. A memread component can be configured to generate multiple synchronization tokens to the memwrite component.

In implementing the HLL code provided in Example 1 above, the value of x is written to addr1 by memwrite component 312. After the write is complete, component 312 generates two synchronization tokens 342 and 344, which are output to respective memread components 320 and 314. Memread components 314 and 320 operate concurrently, each reading the value stored at the input memory addresses (addr1 or addr2), once both the address and synchronization token are available. Memread component 314 outputs the value read to multiply component 316 and outputs the synchronization token 345 to synchronize component 316. Memread component 320 outputs the value read to multiply component 316 and outputs synchronization token 343 to synchronize component 316. When both synchronization token operands have been received by synchronize component 316, the synchronize component performs an operation which produces a synchronization token 346. After the result of the multiply operation 316, synchronization token 346, and addr2 are received by memwrite component 318, the result of the multiply operation is written to memory location addr2. When memwrite component 318 completes, one or more synchronization tokens 350 are output to the components of the next dataflow sequence.

FIG. 4 illustrates the pipelined dataflow specification of FIG. 3 in which the function provided by the synchronize component is implemented by the second memwrite component. Memwrite component 418 is configured to receive multiple memory synchronization tokens as operands from the multiple preceding memread components. In this configuration, memwrite component 418 is configured to receive synchronization tokens 343 and 345 as operands from each of the preceding memread components 320 and 314. When all operands have been received, memwrite component 418 writes the data value received from multiply component 316 to memory address addr2.

In some embodiments, independent memory operations are determined by analyzing dependencies between memory pointers. Pointers are grouped according to determined dependencies, and memory access operations associated with the pointers of different groups are performed in parallel by synchronizing each group with a distinct synchronization token.

Figure 5:
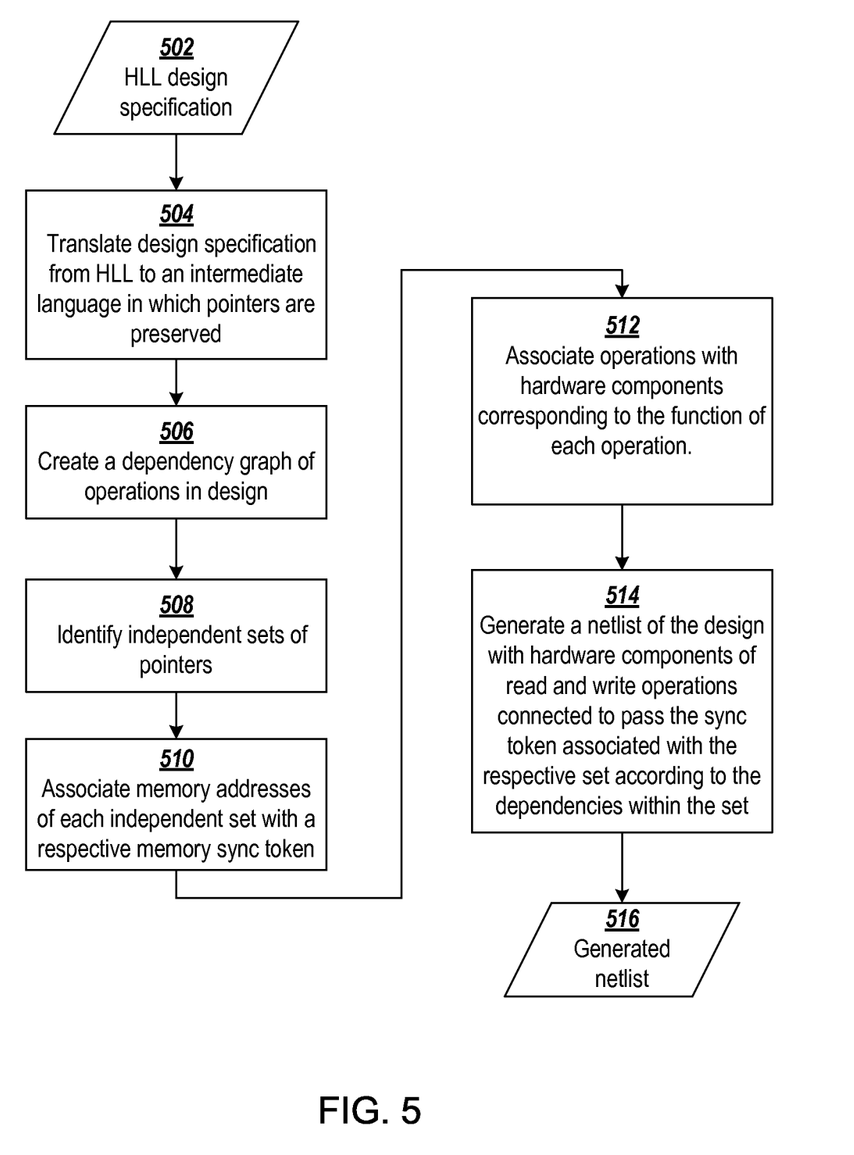
FIG. 5 illustrates a flowchart of a process for converting a high level language specification into a dataflow circuit design with parallel memory access.

FIG. 5 illustrates a flowchart of process of converting a high level language specification into a pipelined circuit design with parallel memory access. An HLL specification 502 is translated into an intermediate level language at step 504 in which memory pointer information is preserved. A dependency graph of operations within the intermediate level specification is created at step 506. Independent sets of pointers contained in the intermediate level specification are identified at step 508. The group of memory addresses of each identified set is associated with a memory synchronization token at step 510. Each operation of the intermediate level specification is associated with a hardware component corresponding to the function of the respective instruction at step 512. A netlist 516 of the intermediate level specification is then generated at step 514. When the netlist is generated, the hardware components corresponding to the read and write operations of each set are coupled and arranged according to the dependencies determined at step 506. The read and write operations require the synchronization token associated with the set as a parameter before accessing memory locations of the set.

Example 2, below, shows an example HHL code segment that may be implemented in hardware.

*addr1=x;
int b=*addr1/2;
*addr1=b;
*addr2=x;
int a=*addr2* *addr3;
*addr3=a;

EXAMPLE 2

In the code segment shown in Example 2, pointer addr1 is independent, because its calculated value is not dependent on the value stored in another memory location nor is the value stored in another memory location dependent on the value stored in memory location addr3. In contrast, pointers addr2 and addr3 are dependent pointers, because the value "a" that is stored in addr3 in the third instruction is calculated in part from the value stored in addr1. According to the process shown in FIG. 5, pointer addr1 would be associated with a first synchronization token, and pointers addr2 and addr3 would be associated with a second synchronization token.

The process shown in FIG. 5 may be used separately or in conjunction with the process shown in FIG. 1. For example, after independent sets of pointers are identified, sequences of operations associated with each of the sets of pointers can be analyzed according to the process of FIG. 1 to determine read operations in each sequence that can further be performed in parallel. In this manner, data sequences of independent sets of pointers can be implemented in parallel and sequential read operations within each of the sequences may be performed concurrently.

Figure 6:
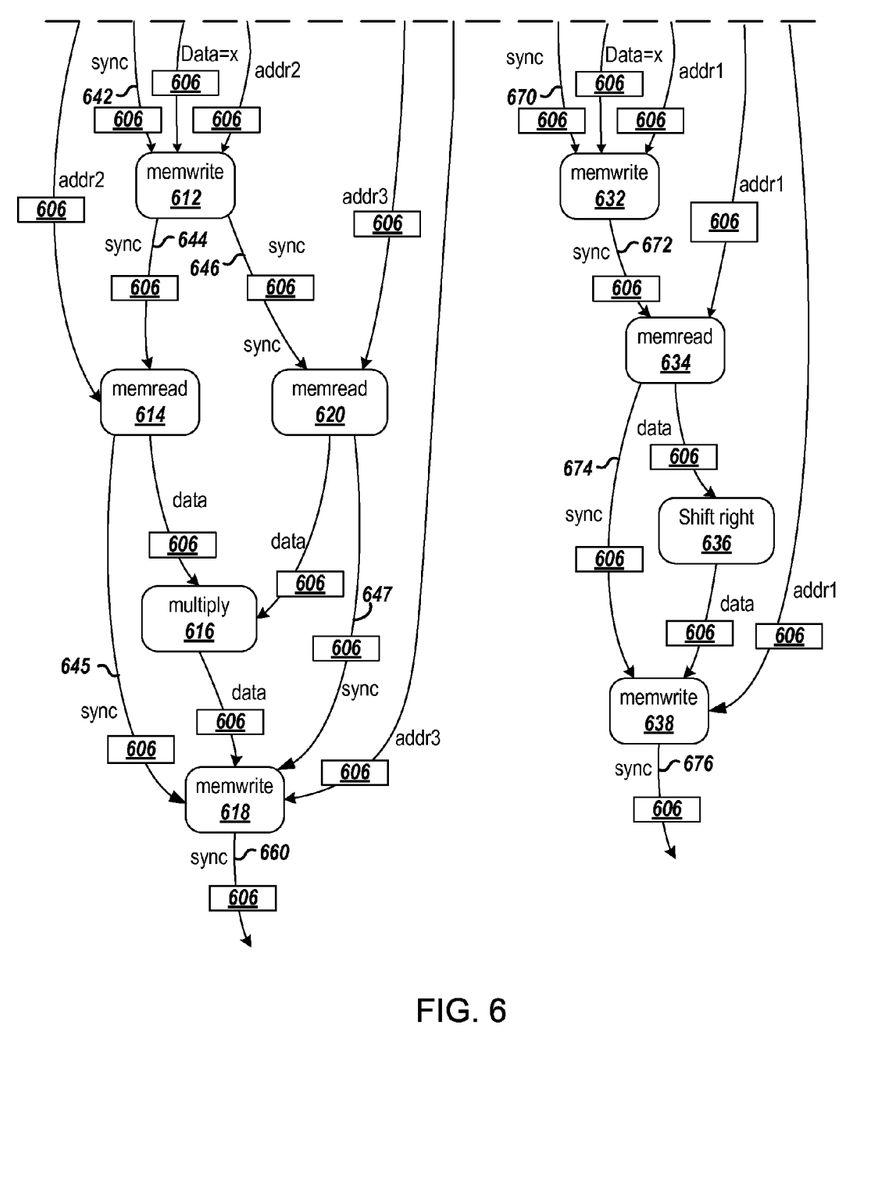
FIG. 6 illustrates a dataflow circuit diagram of an example netlist generated according to the processes shown in FIGS. 1 and 5.

FIG. 6 illustrates a dataflow circuit diagram of an example netlist generated according to the processes shown in FIGS. 1 and 5. Components implementing each instruction of the intermediate representation are interconnected by FIFOs 606 and coupled to an external memory as shown in FIG. 2.

In this example, the set of HLL instructions associated with addr1 are shown implemented by components on the right, and the set of HLL instructions associated with addr2 and addr3 are shown implemented by the components on the left. Because the memread and memwrite components of the two sets access external memory (not shown) independently of each other, they can be implemented in parallel. In implementing the HLL instructions of Example 2 pertaining to addr1, the value of x is written to addr1 at component 632. At this point, component 632 outputs a synchronization token 672 to memread component 634. Memread component 634 reads the value at addr1 and generates a synchronization token 674, which is passed to memwrite component 638. Component 634 passes the value read to shift-right component 636 which performs the divide by two operation. After the shift component completes the divide by two operation and the result is received by memwrite component 638, the value is written to memory location addr1. A synchronization token 676 is generated and output to the next dataflow sequence.

In implementing the HLL instructions of Example 2 pertaining to addr2 and addr3, the value x is written to addr2 at component 612. In this example, the read operations in the set of instructions pertaining to addr2 and addr3 are implemented in parallel according to the method shown in FIG. 1. Like the example shown in FIG. 3, memwrite component 612 generates two synchronization tokens 644 and 646, which are output to respective memread components 614 and 620. Memread components 614 and 620 concurrently read the values stored at external memory addresses addr2 and addr3, respectively. Memread components 614 and 620 pass the values read to multiply component 616, and generate and output synchronization tokens 645 and 647 to memwrite component 618. After the result of the multiply component 616 and synchronization tokens 645 and 647 are received by memwrite component 618, the result is written to memory location addr3. Synchronization token 660 is generated and output to the next dataflow sequence.

Figure 7:
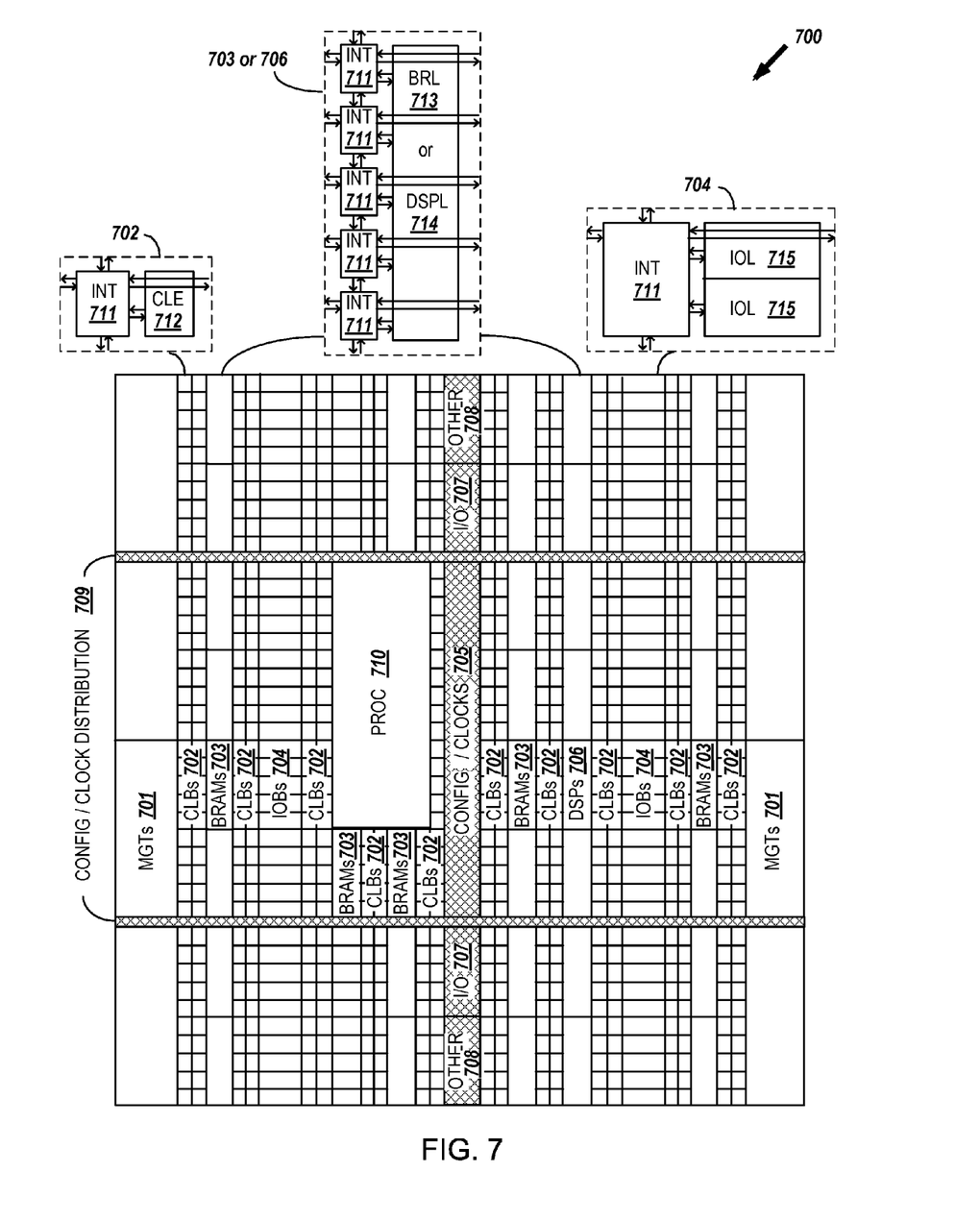
FIG. 7 is a block diagram of a programmable integrated circuit that may be configured to implement a synchronized dataflow circuit.

FIG. 7 is a block diagram of an exemplary programmable integrated circuit, specifically a field programmable gate array (FPGA), which may be configured to implement synchronization of memory access operations in accordance with the described embodiments. FPGAs can include several different types of programmable logic blocks in the array. For example, FIG. 7 illustrates an FPGA architecture (700) that includes a large number of different programmable tiles including multi-gigabit transceivers (MGTs 701), configurable logic blocks (CLBs 702), random access memory blocks (BRAMs 703), input/output blocks (IOBs 704), configuration and clocking logic (CONFIG/CLOCKS 705), digital signal processing blocks (DSPs 706), a reconfiguration port (not shown), specialized input/output blocks (I/O 707), for example, e.g., clock ports, and other programmable logic 708 such as digital clock managers, analog-to-digital converters, system monitoring logic, and so forth. Some FPGAs also include dedicated processor blocks (PROC 710).

In some FPGAs, each programmable tile includes a programmable interconnect element (INT 711) having standardized connections to and from a corresponding interconnect element in each adjacent tile. Therefore, the programmable interconnect elements taken together implement the programmable interconnect structure for the illustrated FPGA. The programmable interconnect element INT 711 also includes the connections to and from the programmable logic element within the same tile, as shown by the examples included at the top of FIG. 7.

For example, a CLB 702 can include a configurable logic element CLE 712 that can be programmed to implement user logic plus a single programmable interconnect element INT 711. A BRAM 703 can include a BRAM logic element (BRL 713) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 706 can include a DSP logic element (DSPL 714) in addition to an appropriate number of programmable interconnect elements. An 10B 704 can include, for example, two instances of an input/output logic element (IOL 715) in addition to one instance of the programmable interconnect element INT 711. As will be clear to those of skill in the art, the actual I/O pads connected, for example, to the I/O logic element 715 are manufactured using metal layered above the various illustrated logic blocks, and typically are not confined to the area of the input/output logic element 715.

In the pictured embodiment, a columnar area near the center of the die (shown shaded in FIG. 7) is used for configuration, clock, and other control logic. Horizontal areas 709 extending from this column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, the processor block PROC 710 shown in FIG. 7 spans several columns of CLBs and BRAMs.

Note that FIG. 7 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual FPGA more than one adjacent column of CLBs is typically included wherever the CLBs appear, to facilitate the efficient implementation of user logic.

Figure 8:
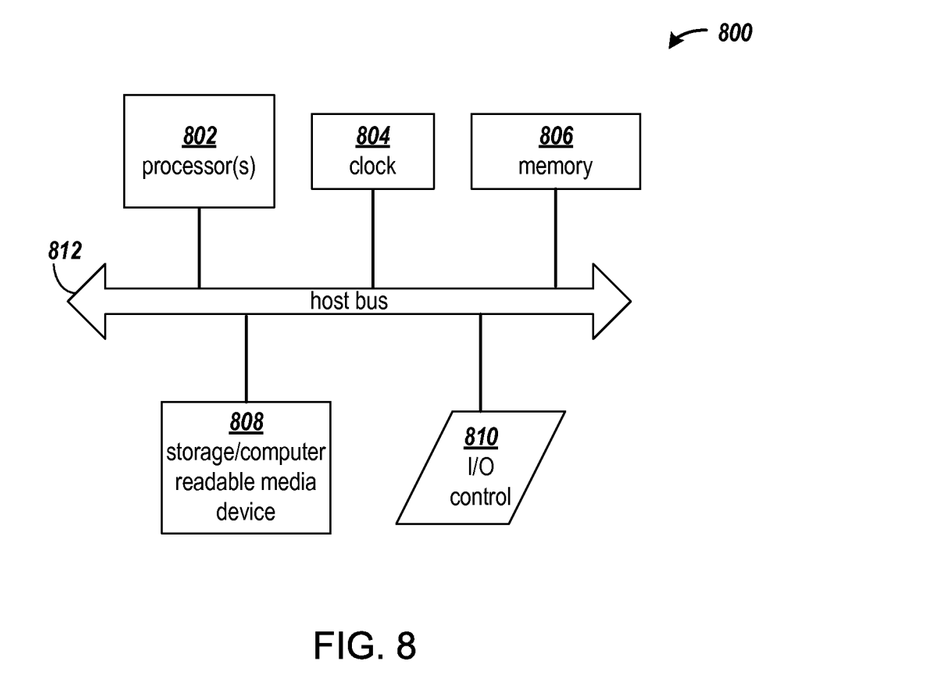
FIG. 8 is a block diagram of an example computing arrangement, which may be configured to implement the processes described herein.

FIG. 8 is a block diagram of an example computing arrangement on which the processes described herein may be implemented using a general purpose processor. Those skilled in the art will appreciate that various alternative computing arrangements, including one or more processors and a memory arrangement configured with program code, would be suitable for hosting the processes and data structures and implementing the various methods described herein. The computer code, comprising the described processes encoded in a processor executable format, may be stored and provided via a variety of computer-readable storage media or delivery channels such as magnetic or optical disks or tapes, electronic storage devices, or as application services over a network.

Processor computing arrangement 800 includes one or more processors 802, a clock signal generator 804, a memory unit 806, a storage unit 808, and an input/output control unit 810 coupled to host bus 812. The arrangement 800 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 802 may be one or more general purpose processors, or a combination of one or more general purpose processors and suitable co-processors, or one or more specialized processors (e.g., RISC, CISC, pipelined, etc.).

The memory arrangement 806 typically includes multiple levels of cache memory, a main memory. The storage arrangement 808 may include local and/or remote persistent storage such as provided by magnetic disks (not shown), flash, EPROM, or other non-volatile data storage. The storage unit may be read or read/write capable. Further, the memory 806 and storage 808 may be combined in a single arrangement.

The processor arrangement 802 executes the software in storage 808 and/or memory 806 arrangements, reads data from and stores data to the storage 808 and/or memory 806 arrangements, and communicates with external devices through the input/output control arrangement 810. These functions are synchronized by the clock signal generator 804. The resource of the computing arrangement may be managed by either an operating system (not shown), or a hardware control unit (not shown).

The present invention is thought to be applicable to a variety of systems for memory access synchronization. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims and their equivalents.

What is claimed is:

1. A method of creating a pipelined design from a high level language (HLL) specification, comprising:
   translating the HLL specification into an intermediate level language specification of operations of the pipelined circuit design;
   creating a data dependency graph of the operations;
   identifying from the dependency graph a sequence of operations that is bounded by two write operations and has no intervening write operations between the two write operations;
   identifying two or more read operations within the sequence;
   generating a pipelined design specification from the dependency graph and hardware components associated with the operations in the intermediate level language specification using a programmed processor;
   wherein the generated pipelined design specification includes a dataflow memory and an external memory, the dataflow memory including respective first-in-first-out (FIFO) buffers coupled between pairs of the hardware components;

wherein at least two of the components corresponding to the two or more read operations access the external memory in parallel;
   wherein each component of two or more of the hardware components corresponding to the two or more read operations requires a respective synchronization token input from a respective first one of the FIFO buffers, outputs data read from the external memory to a respective second FIFO buffer of the FIFO buffers, and outputs a synchronization token to a respective third FIFO buffer of the FIFO buffers; and
   wherein each component of two of the hardware components corresponding to the two write operations requires a synchronization token as input from a respective fourth one of the FIFO buffers, requires data and address as input from respective fifth and sixth ones of the FIFO buffers, and outputs a synchronization token to a respective seventh one of the FIFO buffers upon completion of the operation.

2. The method of claim 1, wherein each hardware component comprises an instruction processor.

3. The method of claim 1, wherein:
   the two write operations include a first write operation and a second write operation; and
   the component corresponding to the first write operation outputs a synchronization token to each of the components corresponding to the two or more read operations.

4. The method of claim 3, wherein the component corresponding to the second write operation of the sequence is configured to perform a write operation in response to receiving a synchronization token as input from each of the components corresponding to the two or more read operations.

5. The method of claim 1, wherein each hardware component comprises a circuit core and the pipelined specification comprises a netlist.

6. The method of claim 5, wherein the netlist specifies the component corresponding to the first write operation communicating the synchronization token to the components corresponding to the two or more read operations via respective first-in-first-out buffers.

7. The method of claim 6, wherein the netlist specifies components corresponding to the two or more read operations communicating the synchronization token to the component corresponding to the second write operation via respective first-in-first-out buffers.

8. The method of claim 5, wherein:
   the netlist includes a synchronize component coupled to the input of the component corresponding to the second write operation of the sequence and coupled to the outputs of the components that correspond to the two or more read operations; and
   the synchronize component is configured to output a synchronization token to the component corresponding to the second write operation in response to input of synchronization tokens from the components corresponding to the two or more read operations.

9. The method of claim 8, wherein the synchronize component is selected from a set of components corresponding to instructions defined in the intermediate level language specification.

10. The method of claim 8, wherein:
    the synchronize component includes a plurality of parameter inputs; and
    each of the plurality of parameter inputs is coupled in the netlist to receive a synchronization token from one of the components corresponding to one of the two or more read operations.

11. The method of claim 10, wherein the number of inputs in the plurality of parameter inputs is greater than the number of components corresponding to the two or more read operations that access a memory in parallel.

12. A method of creating a pipelined circuit design from a high level language (HLL) specification, comprising:
- identifying in the HLL specification, a first set and a second set of memory pointers, wherein the pointers in the first set are independent of the pointers in the second set;
- translating the HLL specification into an intermediate level language specification;
- creating a dependency graph of operations contained in the intermediate level language specification;
- generating with a programmed processor, a netlist from the dependency graph and hardware components associated with the operations of the intermediate level language specification;
- wherein the generated netlist includes a dataflow memory and an external memory, the dataflow memory including respective first-in-first-out (FIFO) buffers coupled between pairs of the hardware components, and the memory pointers in the first and second sets referencing the external memory;
- wherein the netlist specifies that read and write operations to memory addresses corresponding to the first set of memory pointers are performed concurrently with read and write operations to memory addresses corresponding to the second set of memory pointers;
- wherein each hardware component associated with each of the read operations to memory addresses corresponding to the first and second sets of memory pointers, requires a respective synchronization token input from a respective first one of the FIFO buffers, outputs data read from the external memory to a respective second FIFO buffer of the FIFO buffers, and outputs a synchronization token to a respective third FIFO buffer of the FIFO buffers; and
- wherein each hardware component associated with each of the write operations to memory addresses corresponding to the first and second sets of memory pointers, requires a synchronization token as input from a respective fourth one of the FIFO buffers, requires data and address as input from respective fifth and sixth ones of the FIFO buffers, and outputs a synchronization token to a respective seventh one of the FIFO buffers upon completion of the operation.

13. The method of claim 12, further comprising:
associating memory addresses corresponding to the first and second sets of memory pointers with respective synchronization tokens.

14. The method of claim 13, further comprising:
- identifying from the dependency graph a sequence of operations that corresponds to the first set of memory pointers that is bounded by two write operations and that has no intervening write operations between the two write operations;
- identifying two or more read operations within the sequence; and
- wherein the netlist specifies that at least two of the components corresponding to the two or more read operations access a memory in parallel, and each component corresponding to the two or more read and the two write operations requires a synchronization token corresponding to the first set of memory pointers.

15. A system, comprising:
- a processor;
- a memory arrangement coupled to the processor and configured with processor-executable instructions that when executed cause the processor to:
  - translate a high level language (HLL) specification into an intermediate level language specification;
  - create a data dependency graph of the operations of the intermediate level language specification;
  - identify in the intermediate level language specification, a sequence of operations that is bounded by two write operations and has no intervening write operations between the two write operations;
  - identify two or more read operations within the sequence;
  - generate a netlist from the dependency graph and hardware components associated with the operations of the intermediate level language specification;
  - wherein the generated netlist specifies a dataflow memory and an external memory, the dataflow memory including respective first-in-first-out (FIFO) buffers coupled between pairs of the hardware components, and for each of the hardware components that is an arithmetic component, the arithmetic component is configured to wait for operand data in one or more of the FIFO buffers and not wait for input of a synchronization token;
  - wherein at least two of the components corresponding to the two or more read operations access the external memory in parallel;
  - wherein each respective component of two or more of the hardware components that corresponds to the read operations requires a respective synchronization token input from a respective first one of the FIFO buffers, outputs data read from the external memory to a respective second FIFO buffer of the FIFO buffers, and outputs a synchronization token to a respective third FIFO buffer of the FIFO buffers; and
  - wherein each component of two of the hardware components corresponding to the two write operations requires a synchronization token as input from a respective fourth one of the FIFO buffers, requires data and address as input from respective fifth and sixth ones of the FIFO buffers, and outputs a synchronization token to a respective seventh one of the FIFO buffers upon completion of the operation.

16. The system of claim 15, wherein:
- the two write operations include a first write operation and a second write operation; and
- the component corresponding to the first write operation outputs a synchronization token to each of the components corresponding to the two or more read operations.

17. The system of claim 15, wherein the component corresponding to the second write operation of the sequence is configured to perform a write operation in response to receiving a synchronization token as input from each of the components corresponding to the two or more read operations that access a memory in parallel.

18. The system of claim 15, wherein:
- the netlist includes a synchronize component coupled to the input of the component corresponding to the second write operation of the sequence and the outputs of components corresponding to the two or more read operations; and
- the synchronize component is configured to output a synchronization token to the component corresponding to the second write operation in response to input of a synchronization token from each of the components corresponding to the two or more read operations.

19. The system of claim 15, wherein the instructions configure the netlist such that the synchronization token from the component corresponding to the first write operation is communicated to the components corresponding to the two or more read operations via respective first-in-first-out buffers.

* * * * *